United States Patent [19]

Huang et al.

[11] Patent Number: 5,521,949
[45] Date of Patent: May 28, 1996

[54] SYNCHRONIZATION SCHEME FOR DIGITAL COMMUNICATIONS SYSTEMS TRANSPORTING DATA AT A CUSTOMER-CONTROLLED RATE

[75] Inventors: Gang Huang, Highlands; Jean-Jacques Werner, Holmdel, both of N.J.

[73] Assignee: AT&T Corp., Murray Hill, N.J.

[21] Appl. No.: 891,500

[22] Filed: May 29, 1992

[51] Int. Cl.$^6$ .............................. H04L 23/00; H04L 5/12
[52] U.S. Cl. ....................... 375/377; 375/261; 375/298; 375/340
[58] Field of Search ................. 375/39, 59, 94, 375/121, 112, 261, 340, 377, 298, 316, 363, 295; 371/43, 5.1, 5.5; 332/103; 329/304; 370/110.1, 111, 84, 102

[56] References Cited

U.S. PATENT DOCUMENTS

| | | | |
|---|---|---|---|
| 3,680,051 | 7/1972 | Blessin et al. | 340/172.5 |
| 3,825,899 | 7/1974 | Haeberle et al. | 370/102 |
| 4,224,473 | 9/1980 | Kaul et al. | 370/102 |
| 4,644,537 | 2/1987 | Gitlin et al. | 375/39 |
| 4,651,320 | 3/1987 | Thapar | 370/119 |
| 4,941,154 | 7/1990 | Wei | 371/43 |
| 4,993,046 | 2/1991 | Saito et al. | 371/43 X |
| 5,105,443 | 4/1992 | Betts et al. | 375/39 |
| 5,134,633 | 7/1992 | Werner | 375/38 |
| 5,173,900 | 12/1992 | Miller et al. | 370/110.1 |
| 5,251,236 | 10/1993 | Brehmer et al. | 375/59 |

FOREIGN PATENT DOCUMENTS 0459058  12/1991  European Pat. Off. ........ H04L 27/34
1479313   7/1977  United Kingdom ............ H04L 25/36

OTHER PUBLICATIONS

"An Asymmetric Encoding Scheme for Word Stuffing", 8010 Bell systems technical journal, Nov. 6, 1969, by M. M. Buchner, Jr., pp. 379–398.
"Synchronization of PCM Channels by the Method of Word Stuffing", IEEE Transactions on Communication Technology, vol. COM-16, No. 2, Apr. 1968, by S. Butman, pp. 252–253.

Primary Examiner—Stephen Chin
Assistant Examiner—Tesfaldet Bocure
Attorney, Agent, or Firm—David R. Padnes; Henry T. Brendzel

[57] ABSTRACT

A synchronization scheme for bidirectional data applications where the customer supplies data for transmission at a rate which is customer controlled. In accordance with the present invention, in each transmission direction, the customer data is converted into data symbols in a predetermined constellation. In response to these data symbols, additional symbols are added. In the disclosed embodiment, the additional symbols added are symbols lying outside of the constellation and are not used to represent customer data. The additional symbols added raise the symbol rate in each transmission direction to one higher than that provided by the symbols representative of the customer data alone. This higher symbol rate in each transmission direction is preferably the same, or the higher symbol rate in one direction is related to the higher symbol rate in the other direction by a rational number. At each receiver, the additional symbols are removed and customer data is recovered from its representative data symbols.

17 Claims, 2 Drawing Sheets

SYNCHRONIZATION SCHEME FOR DIGITAL COMMUNICATIONS SYSTEMS TRANSPORTING DATA AT A CUSTOMER-CONTROLLED RATE

TECHNICAL FIELD

The present invention relates to communications systems and, more particularly, to such systems which couple data supplied to the system at a rate controlled by the customer or data supplier.

BACKGROUND OF THE INVENTION

In some data system applications, a customer supplies data for transport through a modem or transceiver to a communications system at a data rate that is controlled by the communications system. In such applications, the data supplied by the customer is typically synchronized with a clock signal coupled from the communications system to the customer. In other data system applications, the customer supplies data to the communications system at a rate which is customer-controlled. Such systems can utilize either two or four conductors. In two-conductor systems, bidirectional communications are provided through a single conductor pair while in four-conductor systems the signals coupled in each direction are transported by different conductor pairs. In either case, the data rates in both directions, each controlled by the customer at each system end, can be the same or different from one another.

Echoes or crosstalk is a problem in communications systems which can often be substantially eliminated by the use of echo cancellers. Such cancellers can be implemented within an analog "front end" interpolator of the transceiver. In this implementation, in the transceiver's receiver, the incoming line signal from a two- or four-wire communications system is sampled by a first analog-to-digital (A/D) converter. The echo canceller then subtracts tile synthesized echo from the digital samples provided by the converter using tile transmit symbols provided by the transceiver's transmitter. The echo-free samples are then converted back to an analog signal by a digital-to-analog converter (D/A), passed through a low-pass filter and supplied to a second A/D converter. This second A/D converter provides digital samples to a conventional receiver which outputs the received data. In the transmit direction, the transmitter provides the transmit symbols which are pulse shaped by shaping circuitry and thence converted into an analog signal by a D/A converter. For proper operation of the echo canceller, the first A/D converter in the receiver and both D/A converters are strobed by the transmit clock while the second A/D converter is strobed by the receive clock. The challenge in implementing this front end is to provide precision converters on a single integrated circuit with asynchronous transmit and receive clocks. This is often difficult, if not impossible, to achieve.

To eliminate this problem, more recently developed transceivers utilize A/D and D/A converters respectively disposed in tile receiver and transmitter of the transceiver which are strobed by a common sample clock. The A/D converter forms samples of the incoming signal received from a remote location while the D/A converter in the transmitter forms samples of the signal to be transmitted to the remote location. To compensate for the fact that the A/D converter in the receiver is not synchronized to the transmitter clock at the remote location, the output of the A/D converter is coupled through the echo canceller to a digital interpolator. The digital interpolator alters the sample values it receives in response to a control signal generated by a timing recovery circuit. The control signal is representative of any asynchronism between the common sample clock and the remote transmitter clock. The effect of the interpolator, therefore, is to alter the timing phase of the common sample clock source and provide the samples which would have been formed had the common sample clock been synchronized to tile transmitter clock at the remote location. While this solution provides satisfactory results in many applications, the cost of implementing a digital interpolator for high-speed, i.e., $\geq 0.5$ megabits/second cannot be provided within the desired cost objectives.

It would therefore be desirable if a synchronization scheme could be developed which is suitable for high-speed data applications which could be readily implemented at low cost in an integrated circuit.

SUMMARY OF THE INVENTION

A synchronization scheme is proposed for bidirectional data applications where the customer supplies data for transmission at a rate which is customer-controlled. In accordance with the present invention, in each transmission direction, the customer data is converted into data symbols in a predetermined signal constellation. In response to these data symbols, additional symbols are added to raise the symbol rate to one that is higher than that provided by the data symbols alone. In the disclosed embodiment, the additional symbols are those lying outside of the signal constellation and are not used to represent customer data.

The higher symbol rate in each transmission direction is the same, or tile higher symbol rates in the two directions are related to one another by a rational number. At the receiver, these additional symbols are removed and the customer data is recovered from its representative data symbols.

Advantageously, the present invention solves the prior art problem associated with echo or crosstalk cancellation, avoids the need for a digital interpolator and can be readily implemented on a semiconductor device.

DETAILED DESCRIPTION

Figure 1:
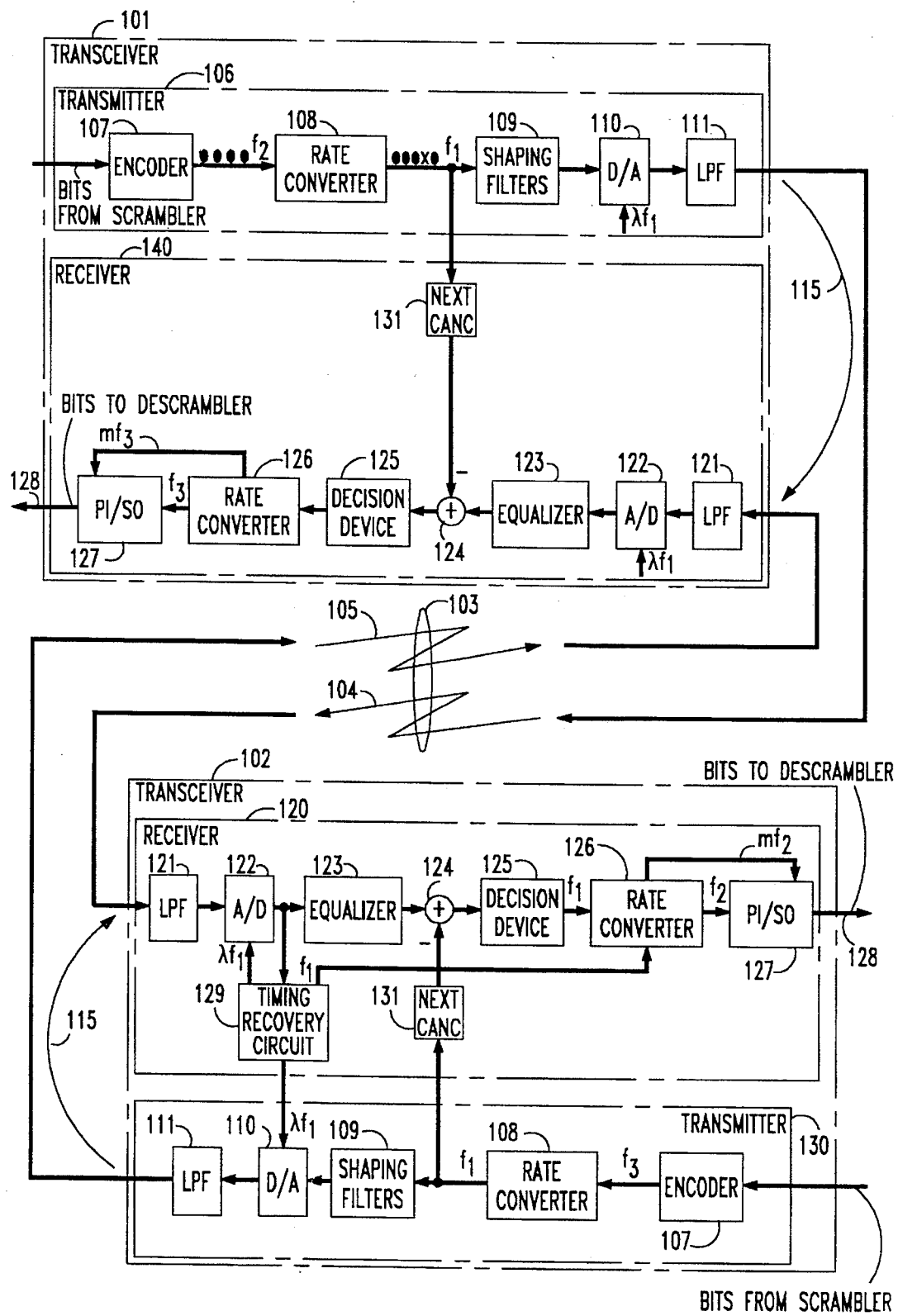
FIG. 1 is a block-schematic diagram of an illustrative communications system incorporating an embodiment of the present invention.

An illustrative communications system 100 incorporating the present invention is shown in FIG. 1. System 100 transports customer data received from a first transceiver 101 to a second transceiver 102 and vice versa via a four-conductor communications path 103. This customer data may be representative of a variety of data signals including digitized speech and/or video, ASCII characters, etc. For purposes of illustration, it is assumed that each transceiver utilizes carrierless amplitude/phase (AM/PM) modulation. It is, of course, understood that the present invention is not limited to any particular modulation format and, indeed, can be used with virtually any modulation scheme which maps customer data bits into symbols. Path 103 includes a first conductor pair 104 for transporting data from transceiver 101 to transceiver 102 and a second conductor pair 105 for transporting data from transceiver 102 to transceiver 101. Transceivers 101 and 102 each convert the customer data bits into signals which can be coupled through the communications path.

In transceiver 101, customer data bits received at a rate controlled by the customer are scrambled using conventional apparatus (not shown) and supplied to transmitter portion 106. These scrambled customer data bits may be arranged into a particular frame format or may be unstructured, i.e., not arranged into any particular frame format, since the operation of applicants' invention does not rely on the presence or absence of a frame format. Within the transmitter portion, encoder 107 maps each of a plurality of m successive scrambled customer data bits, where m is a predetermined integer, into one data symbol in a signal constellation. The signal constellation, as will be discussed, includes a plurality of data symbols and each different combination of m successive scrambled data bits is mapped into a different data symbol. In accordance with the present invention, the signal constellation also includes additional symbols which are not used to represent customer data bits but are added as required to increase the symbol rate over that provided by the conversion of customer data bits into data symbols by encoder 107.

Figure 2:
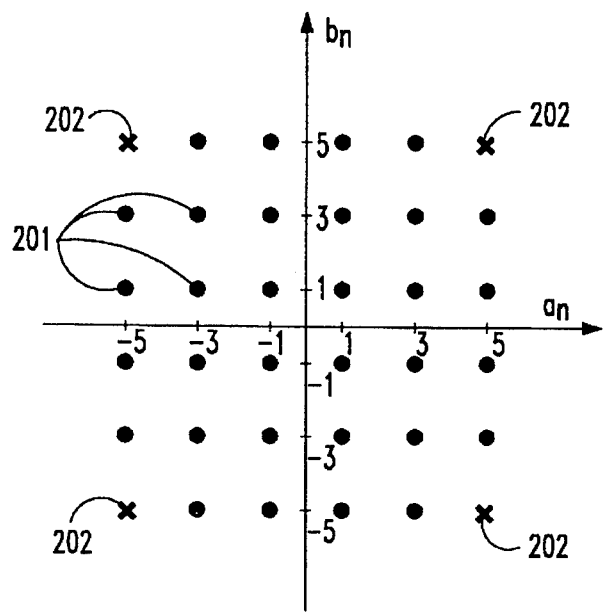
FIG. 2 is a diagram of an illustrative signal constellation which incorporates the principles of the present invention.

Refer now to FIG. 2 which shows an illustrative signal constellation 200 for use within system 100. Constellation 200, as shown, includes 32 data symbols, designated by reference numeral 201, which are representative of customer data bits. Each of these data symbols is representative of a different combination of five consecutive customer data bits and has two symbol components designated by $a_n$ and $b_n$. Symbol components $a_n$ and $b_n$ can take on the values of $\pm 1$, $\pm 3$, and $\pm 5$. The additional symbols designated by reference numeral 202 are those inserted to increase the symbol rate over that provided by encoder 107. In the illustrative signal constellation there are four such additional symbols and the $a_n$ and $b_n$ values for these symbols are $\pm 5$. The particular one of the four symbols 202 inserted at any time may be determined randomly or may follow a predetermined sequential order.

Refer back now to FIG. 1. The rate of data symbols outputted from encoder 107 is $f_2$, where $f_2$ is a submultiple of the rate of customer supplied data bits and the particular submultiple is determined by the number of bits, m, mapped into each symbol. More specifically, in the illustrative embodiment of FIG. 2, five bits are mapped into one data symbol and $f_2$ is $1/5$ of the customer-controlled data bit rate. Rate converter 108 receives each data symbol outputted by encoder 107 and selectively adds additional symbols. These additional symbols raise the symbol rate from $f_2$ to $f_1$. Rate $f_1$ is selected to be higher than the maximum value of $f_2$, it being understood that as the customer-controlled data bit rate can vary up to some, predefined maximum limit, it follows that $f_2$ can also vary to $1/m$ times this limit. Rate $f_1$ can be a predetermined fixed or a variable quantity. Of course, when $f_1$ is fixed and $f_2$ is variable, the rate at which the additional symbols are added (X in FIG. 1) is also variable in an inverse manner, in the sense that as one rate goes up the other must correspondingly go down. In FIG. 1 the outputted data symbols from encoder 107 are represented by dots and the additional symbols are represented by "Xs" interposed between the dots. The sequence of data and additional symbols provided by rate converter 108 are then passed through shaping filter 109, D/A converter 110 and low-pass filter 111 before being coupled to first conductor pair 104. D/A converter 110 is strobed by a sampling clock signal set to $\lambda f_1$, where $\lambda$ is a predefined scalar quantity typically equal to 3 or 4 and $f_1$ is the transmit symbol clock of the communications system.

The communications path 103 is characterized as being one wherein a portion of the signal transmitted through first conductor pair 104 is coupled into second conductor pair 105 and vice versa. This coupling is represented by arrows 115. Such coupling produces what is generically referred to as near-end crosstalk in four-conductor systems and near-end echoes in two-conductor systems. In the illustrative embodiment four-conductor communications system of FIG. 1, the receiver portion of each of transceivers 101 and 102 incorporates a near-end crosstalk (NEXT) canceller. The NEXT canceller synthesizes the crosstalk in a transceiver's received signal using that transceiver's transmitted signal. This synthesized crosstalk can then be subtracted from the transceiver's received signal so as to eliminate the crosstalk portion thereof.

As shown in FIG. 1, after propagating through conductor pair 103 to a remote location, the received analog signal is coupled to low-pass filter 121 within receiver portion 120 of transceiver 102. The filtered signal is then supplied to A/D converter 122 which samples the analog signal and outputs a digital representation of each sample. A/D converter is strobed by clock signal set to $\lambda f_1$. Equalizer 123 removes the distortion from these digital representations of each sample in well-known fashion.

NEXT canceller 131 synthesizes the crosstalk portion of the equalizer output signal using the symbols to be transmitted by the transmitter portion 130 of transceiver 102. Such symbols, including the symbols 201 and 202 of FIG. 2, are provided by rate converter 108 within transmitter portion 130. Adder 124 then digitally subtracts this synthesized crosstalk from the output of equalizer 123.

Decision device 125 maps each of the "crosstalk-free," equalized digital representations into one of a plurality of permissible symbols which in the illustrative embodiment are the symbols 201 and 202 in FIG. 2. The output of decision device 125 is at a rate $f_1$ since it includes the additional symbols 202. Rate converter 126 detects and extracts each additional symbol from the symbols provided by decision device 125. The rate converter also maps each of the data symbols 201 into its corresponding data bits. The bits representative of each data symbol 201 are outputted in parallel. Parallel-in, serial-out (PI/SO) converter 127 forms a serial stream of data bits at a rate of $mf_2$ on lead 128.

In the opposite direction, scrambled customer data bits are received by transmitter 130 at a customer-controlled rate. This customer may be the same or different from the customer supplying data bits to transmitter 106. The rate of customer data bits supplied in each of the opposite directions of communications can vary independently of one another but in no event can exceed some predetermined limit. Aside from this fact, the data communications from transmit portion 130 of transceiver 102 through second conductor pair 105 to receiver portion 140 of transceiver 101, is substantially identical to that already described. Accordingly, the structure of transmitter portion 130 and that of receiver portion 140 are respectively identical to transmitter portion 106 and receiver portion 120 except for the addition of timing recovery circuit 129. As a result, the same reference numerals are used to designate identical circuitry within both transmitters and receivers. Timing recovery circuit 129 recovers the symbol clock $f_1$ from the digital samples provided by A/D converter 122 in well-known fashion. Circuit 129 then forms the sampling clock $\lambda f_1$ which strobes A/D converter 122 and D/A converter 110 and recovers a transmit clock $f_1$ which is coupled to rate converter 126. It should be noted that in the disclosed embodiment the rate $f_1$ from transmitter 130 to receiver 140 is synchronized with the rate $f_1$ in the opposite direction.

It should be noted that in communications systems 100 the symbol rate transmitted in each direction is the same and is at a rate $f_1$ which is higher than that provided by the conversion of customer data bits into symbols. This advantageously allows the use of a common sample clock, referenced as $\lambda f_1$, for the A/D and D/A converters of a transceiver and also avoids the need to incorporate a digital interpolator in each receiver portion.

Figure 3:
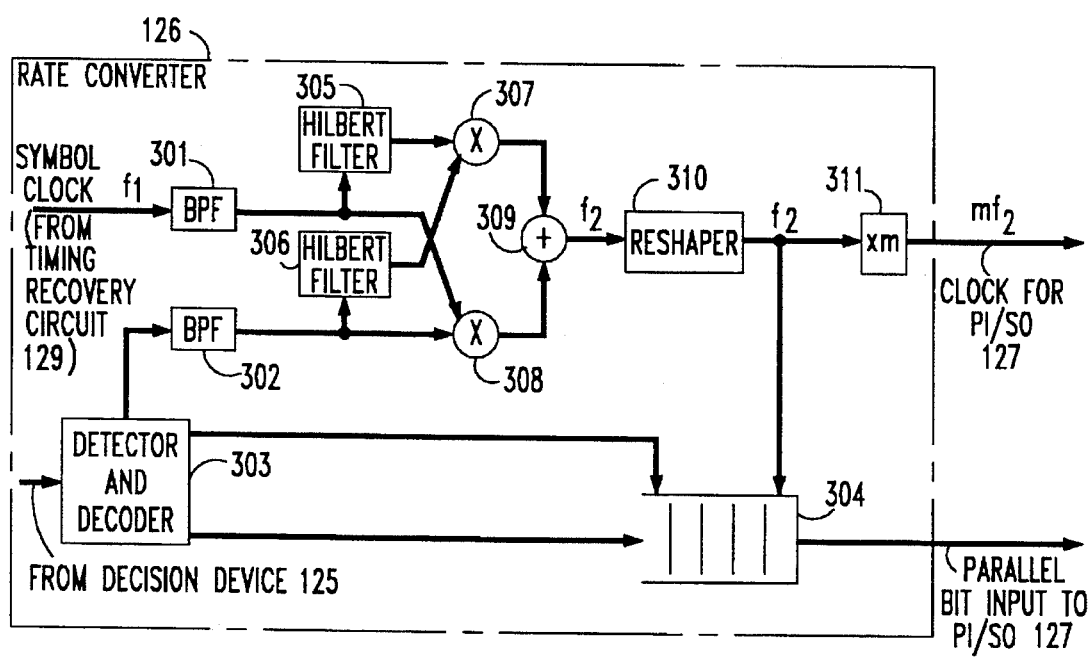
FIG. 3 is a block-schematic diagram of an embodiment of the rate converter 126 of FIG. 1.

Refer now to FIG. 3 which shows a more detailed schematic drawing of the circuitry within a preferred implementation of rate converter 126. Advantageously, this embodiment greatly reduces the jitter introduced by the removal of the additional symbols from the recovered symbol stream provided by the decision device. The outputted symbols from decision device 125 are coupled to detector and decoder 303 which detects the occurrence of each of the additional symbols 202 of FIG. 2 and couples an output pulse to bandpass filter (BPF) 302 on each detected occurrence. This output pulse is also used to inhibit the write clock for first-in first-out (FIFO) device 304. This inhibiting of the FIFO write clock by detector and decoder 303 effectively extracts the symbols 202 from the sequence of symbols 201 and 202. In addition to the above-described detection and removal of the additional symbols, detector and decoder 303 also converts each of the data symbols 201 into their respective bit representations. The bit representations of each of the data symbols 201 outputted from decision device 125 are written into FIFO 304.

A BPF designated by numeral 301 filters the recovered line symbol clock $f_1$ provided by timing recovery circuit 129. The sinusoids generated by BPFs 301 and 302 are respectively coupled to Hilbert transform filters 305 and 306 which shift each received sinusoid by 90 degrees. We may represent the outputs of BPFs 301 and 302 respectively by $\cos(2\pi f_1 t)$ and $\cos(2\pi f_0 t)$, where $f_1$ is the symbol clock and $f_0$ is the frequency of the additional symbols 202. Using these representations, we may represent the outputs of Hilbert filters 305 and 306 respectively by $\sin(2\pi f_1 t)$ and $\sin(2\pi f_0 t)$. Multiplier 307 forms the product of the outputs of Hilbert filters 305 and 306 which may be respectively represented by $\sin(2\pi f_1 t) \sin(2\pi f_0 t)$. Multiplier 308 forms the product of the outputs of BPFs 301 and 302 which may be respectively represented by $\cos(2\pi f_1 t) \cos(2\pi f_0 t)$. To recover the symbol clock $f_2$, the outputs of multipliers 307 and 308 are combined via adder 309. This combination may be represented by $\cos((2\pi f_1 - 2\pi f_0)t)$ which is equal to $\cos(2\pi f_2 t)$, a sinusoid having the frequency of the symbols representative of the encoded customer data bits.

The symbol clock $f_2$ is shaped into a square wave by reshaper 310 and used as a read clock for FIFO 304. The frequency of this square wave is also multiplied by m via frequency multiplier 311 to recover a clock synchronous with the customer data bits supplied to transmitter 106. In the illustrative embodiment m=5. This clock signal is used to strobe parallel-in, serial-out (PI/SO) shift register 127 of FIG. 1. The parallel output of FIFO 304 is the scrambled customer data bits representative of one symbol 201. These bits are converted into serial form by PI/SO converter 127.

It should, of course, be noted that while the present invention has been described in terms of an illustrative embodiment, other arrangements will be apparent to those of ordinary skill in the art. First, for example, while the embodiments of the present invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices. Second, while the present invention has been described in reference to a four-conductor communications system, it is also applicable to a two-conductor system. Third, while in the disclosed embodiment additional symbols, designated by reference numeral 202 and not used to represent customer data are utilized, such additional symbols could be a combination of data symbols 201 which combination has a virtual zero probability of occurring from the encoding of customer data bits. Fourth, while in the disclosed embodiment the symbol rate $f_1$ is the same in each transmission direction, this need not be so. Indeed, the symbol rates may be different so long as they are related to one another by a rational number and the corresponding sampling rates for the A/D and D/A converters satisfy the Nyquist criterion. Lastly, while the customer data bits supplied to each transmitter are scrambled, they can also be coded after scrambling using, for example, a convolutional code. In such case, encoder 107 would be a trellis encoder.

We claim:

1. Apparatus for use in a communications system wherein data is transmitted through a communications facility, said apparatus comprising means, responsive to digital signals, for forming data symbols at a first alterable symbol rate, each of said data symbols being representative of a plurality of digital signals and lying in a signal constellation including a plurality of said data symbols;

means responsive to the formed data symbols for providing additional symbols that are outside said signal constellation so as to raise said first symbol rate to a second symbol rate higher than said first rate; and means for transmitting said data symbols and additional symbols said second symbol rate to said communications facility.

2. The apparatus of claim 1 wherein said first symbol rate varies with time and said additional symbols are provided at a variable rate.

3. The apparatus of claim 2 wherein said variable rate drops when said first symbol rate rises.

4. The apparatus of claim 1 wherein said additional symbols lie outside of said signal constellation and are not representative of said digital signals.

5. The apparatus of claim 1 further including means for receiving a sequence of said data symbols and said additional symbols from said communications facility; and means for extracting said additional symbols from said sequence and for mapping each of said data symbols into its represented digital signal.

6. The apparatus of claim 5 wherein said data symbols and said additional symbols are received at said second rate from said communications facility.

7. The apparatus of claim 5 wherein said data symbols and said additional symbols are received at a third rate from said communications facility, said third rate being related to said second rate by a rational number.

8. A method for use in a communications system whereto data is transmitted through a communications facility, said method comprising the steps of forming data symbols representative of digital signals at a first symbol rate, each of said data symbols being representative of a plurality of digital signals and lying in a signal constellation including a plurality of said data symbols;

providing additional symbols that lie outside said signal constellation to raise said first symbol rate to a second symbol rate higher than said first rate; and transmitting said data symbols and additional symbols at said second symbol rate to said communications facility.

9. A communication system comprising a transmitter and a receiver, said transmitter including means responsive to digital signals for forming data symbols at a first alterable symbol rate, each of said data symbols being representative of a plurality of digital signals and lying in a signal constellation including a plurality of said data symbols;

means responsive to the formed data symbols for providing additional symbols that lie outsider said signal constellation so as to raise said first symbol rate to a second symbol rate higher than said first rate; and means for transmitting said data symbols and additional symbols at said second symbol rate to said communications facility and said receiver including means for receiving a sequence of said data symbols and additional symbols from said communications facility at a third symbol rate; and means for extracting said additional symbols from said sequence and for mapping each of said data symbols into its representative digital signal.

10. The system of claim 9 wherein said second and third symbol rates are equal.

11. The system of claim 9 wherein said second and third symbol rates are related by a rational number.

12. Apparatus for use in a communications system wherein data is transmitted through a communications facility, said apparatus comprising means for receiving a sequence of data symbols and additional non-data related symbols from said communications facility at a first symbol rate, each of said data symbols being representative of a plurality of digital signals and lying in a signal constellation including a plurality of data symbols, said data symbols occurring at a second rate which is less than said first symbol rate and said additional symbols being formed in response to said additional non-data related symbols so as to raise said second symbol rate to said first symbol rate; and means for mapping each of said data symbols into its represented digital signals, said mapping means providing said represented digital signals at a signal rate which is a multiple of said second symbol rate;

wherein said additional symbols lie outside of said signal constellation and are not used to represent said digital signals.

13. The apparatus of claim 12 further including means responsive to supplied digital signals for forming data symbols representative of said supplied digital signals at a second symbol rate lower than said first symbol rate, each of said data symbols being representative of a plurality of digital signals and lying in a signal constellation including a plurality of said data symbols;

means responsive to the formed data symbols for providing additional symbols so as to raise said second symbol rate to a third symbol rate greater than said second symbol rate; and means for transmitting said data symbols and additional symbols at said third symbol rate to said communications facility.

14. The apparatus of claim 13 wherein said third symbol rate is equal to said first symbol rate.

15. The apparatus of claim 13 wherein said third symbol rate is related to said first symbol rate by a rational number.

16. The apparatus of claim 13 wherein said additional symbols are provided at an additional symbol rate and said second symbol rate and said additional symbol rate vary with time.

17. A method for use in a communications system wherein data is transmitted through a communications facility, said method comprising the steps receiving a sequence of data symbols and additional non-data related symbols from said communications facility at a first symbol rate, each of said data symbols being representative of a plurality of digital signals and lying in a signal constellation including a plurality of said data symbols, said data symbols occurring at a second rate which is less than said first symbol rate and said additional symbols being formed in response to said additional non-data related symbols so as to raise said second symbol rate to said first symbol rate; and mapping each of said data symbols into its represented digital signals, said mapping means providing said represented digital signals at a signal rate which is a multiple of said second symbol rate.

\* \* \* \* \*